Jan. 18, 1955 W. W. PHARIS ET AL 2,700,069

MEASURED SERVICE TELEPHONE SYSTEM

Filed March 11, 1950 7 Sheets-Sheet 1

INVENTORS.
WILLIAM W. PHARIS
LEON H. REAGAN
BY Winfred T. Powell
ATTORNEY

MEASURED SERVICE TELEPHONE SYSTEM

PAY STATION ADAPTER

INVENTORS.
WILLIAM W. PHARIS
LEON H. REAGAN
BY Winfred T. Powell
ATTORNEY

MEASURED SERVICE TELEPHONE SYSTEM

PAY STATION ADAPTER

INVENTORS
WILLIAM W. PHARIS
LEON H. REAGAN
BY Winfred T. Powell
ATTORNEY

MEASURED SERVICE TELEPHONE SYSTEM

Filed March 11, 1950 7 Sheets-Sheet 4

NOTES – 1. CONNECT M WIRE TO ALL XX LEVELS NOT REQUIRING DIGIT CANCELLING.

2. CONNECT W WIRE TO ALL XX LEVELS REQUIRING DIGIT CANCELLING.

3. CONNECT Q WIRE TO ALL X LEVELS TO WHICH PAY STATION LINES ARE PERMITTED TO CALL WITHOUT COIN DEPOSIT.

INVENTORS.
WILLIAM W. PHARIS
LEON H. REAGAN
BY Winfred T. Powell
ATTORNEY

INVENTORS.
WILLIAM W. PHARIS
LEON H. REAGAN
BY Winfred T. Powell
ATTORNEY

C.L.R. TRUNK

INVENTORS.
WILLIAM W. PHARIS
LEON H. REAGAN
BY Winfred T. Powell
ATTORNEY

C.L.R. TRUNK

INVENTORS.
WILLIAM W. PHARIS
LEON H. REAGAN
BY Winfred T. Powell
ATTORNEY

United States Patent Office 2,700,069

Patented Jan. 18, 1955

2,700,069

MEASURED SERVICE TELEPHONE SYSTEM

William W. Pharis and Leon H. Reagan, Rochester, N. Y., assignors to Stromberg-Carlson Company, a corporation of New York Application March 11, 1950, Serial No. 149,072

16 Claims. (Cl. 179—6.3)

This invention relates to measured service telephone systems and it more particularly pertains to means for automatically controlling the collection and refund of coins deposited in paystation apparatus at the subscriber's station.

The main object of the present invention is the provision of new and improved circuit arrangements whereby the paystation control circuits at the central office are reduced to a minimum, while providing maximum control.

One specific object of the present invention is to provide arrangement of the central office circuits in a new and improved manner whereby paystation and regular lines establish connections through finder-selector links, each equipped with a paystation adapter for discriminating between calls from regular and paystation lines and for effecting circuit controls in accordance with the type of line calling.

Another object of the invention is to provide a new and improved telephone system in which paystation lines are permitted to call certain levels without the deposit of a coin while other levels may not be called until the required coin is deposited.

It is another object of the invention to provide a new and improved telephone system in which a subscriber at a prepay paystation may dial a single first digit without the deposit of a coin, but further digits dialed without the deposit of a coin are ineffective to control the automatic switching equipment.

It is another object of the invention to provide a new and improved CLR trunk circuit which is arranged to automatically refund a deposited coin at a calling paystation when the call is answered by an operator and which is further arranged to permit the answering operator to manually control the collection or refunding of coins at the calling paystation, and with additional means provided whereby an automatic collecting operation is effected when the receiver is restored at the paystation.

Other objects and advantages of the invention will be apparent as the description proceeds, and the features of novelty which characterize the invention will be pointed out in particularity in the claims annexed to and forming a part of this specification.

In the drawings, Figs. 1, 2, 3, 4, 6 and 7 should be arranged in order from left to right, with Fig. 5 above Fig. 6 for the proper arrangement to enable the circuits to be traced.

In the drawings, the calling subscriber's substation, of the paystation type, is illustrated in the left hand portion of Fig. 1.

The line conductors, to which this paystation is connected, extend through the usual line circuit and line finder, shown in block diagram in Fig. 1, to the paystation adapter shown in Figs. 2 and 3.

The paystation adapter is associated with a first selector, the circuits of which are illustrated in Fig. 4.

Figure 1:
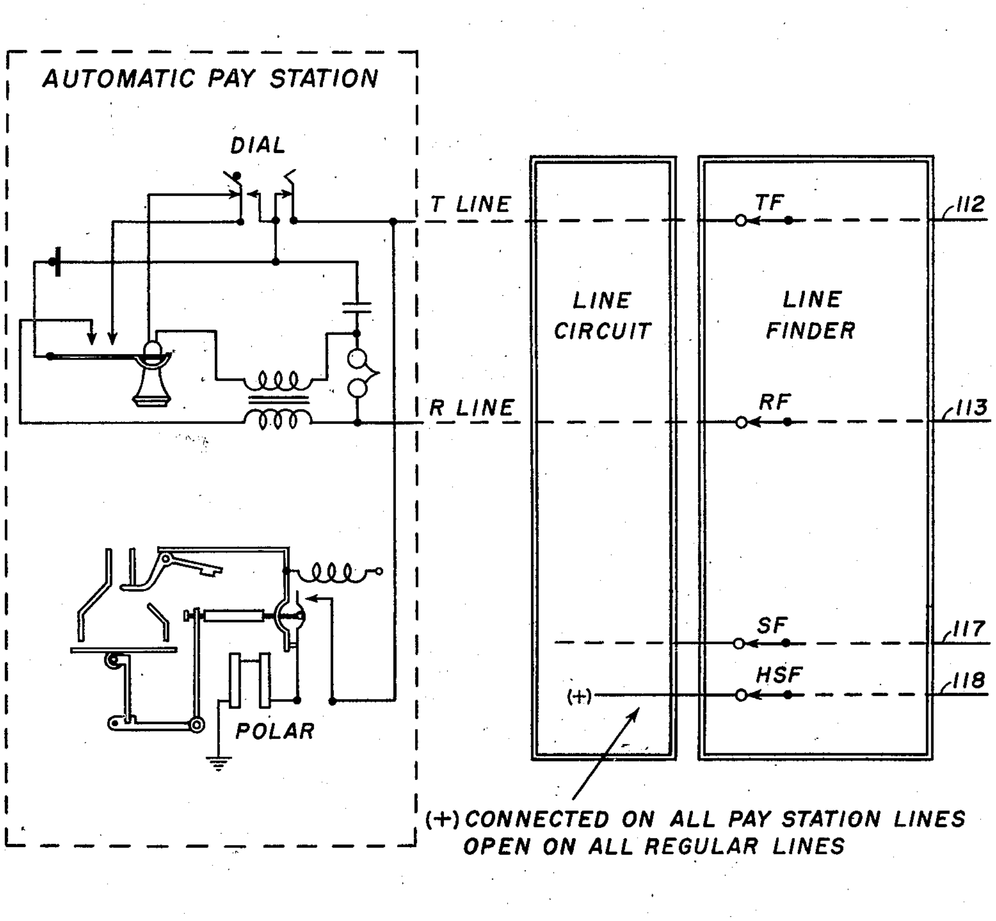

For the purpose of simplifying the illustrations and facilitating the explanation, various parts and circuits constituting the embodiment of the present invention have been shown diagrammatically and certain conventional illustrations have been employed, the drawings having been made more with the purpose of making it easy to understand the principles and mode of operation than with the idea of illustrating the specific construction and arrangement of parts that would be employed in practice. For example, the various relays and their contacts are illustrated in a conventional manner and symbols are used to indicate the connections to the terminals of batteries or other sources of current instead of showing all the wiring connections to these terminals. (+) and (−) symbols are employed to indicate the positive and negative terminals respectively of the usual central office common battery, instead of using the ground and battery symbols frequently found in telephone circuits, it being understood that the (+) terminal is connected to ground. The coin control direct current source is indicated 110 v. (+) and 110 v. (−) to identify the positive and negative high voltage terminals of the coin control battery or other source of direct current. The contacts of the various relays are located at various distances from the block representing the winding of the associated relay, those contacts controlled by a relay being indicated associated therewith by means of a dashed line.

In order to explain the operation of the circuits it will be pointed out how various types of calls are set up through the various circuits illustrated.

*Call from regular substation*

It will first be assumed that a regular substation (not a paystation) removes the receiver and dials the wanted telephone number. It will be understood that the removal of the receiver at the calling station closes the circuit across the T and R line conductors for operating the line circuit (not shown) and the line finder circuit (not shown) to cause the allotted line finder to extend the associated adapter-selector circuit to the calling line. Since any of the well known line circuits and line finder circuits may be used for linking the calling line to the illustrated link circuit, it is not believed necessary to illustrate such line and finder circuits in detail, it being understood that the extension of the allotted link to the calling line is effective to connect this line to the CB or control relay of the first selector.

When such a connection is made, relay CB of the selector is operated over a circuit which may be traced from (+), normally closed overflow contacts 2OF of the first selector, break contact of relay XD, upper winding of relay CB, break contact of relay SW, conductor T, break contact of relay PS of the adapter, break contact of relay RV, conductor 102, break contact of relay CC1, conductor 112, through the line finder and its wiper TF, through the line circuit and line conductor T to the calling substation, through the substation circuit and line conductor R, back through the line circuit and wiper RF of the line finder to conductor 113, break contact of relay CC1, conductor 103, break contact of relay RV, break contact of relay PS, conductor R, break contact of relay SW and lower winding of relay CB to (−).

Relay CB closes a priming circuit for relay SW by energizing the lower winding of this relay. The lower winding of relay SW is an inefficient winding so that its energization does not operate the contacts of the SW relay but does provide sufficient magnetization to cause the SW relay to quickly operate when the selector is advanced to the idle selected trunk, as will be later described. Relay CB closes a circuit for operating relay RD extending from (+), make contact of relay CB and winding of relay RD to (−). Relay RD applies (+) to conductor S leading back to the adapter and thence through break contact of relay SD, conductor 104, break contact of relay CC, break contact of relay TP and conductor 117 to the line finder for holding the line finder and line circuits operated in the well known manner. Relay XD of the selector is operated at this time over a circuit which may be traced from (+), normally closed contact 1XON of the first selector switch off normal contacts, make contact of relay RD and lower winding of relay XD to (−).

The circuits are now in condition for the calling party to dial the wanted number. Since the selector is of the digit canceling type, whereby certain first digits are canceled, it will first be assumed that the calling party dials the digit 1 for advancing the selector to the first level, it being assumed that #1 for the first digit is canceled because wire W is connected to the XX wiper terminal of the first level as indicated by Note 2 of Fig. 4. The release of relay CB in response to the beginning of the impulse of the first digit closes a circuit for magnet X which may be traced from (+), break contact of relay CB, make contact of relay RD, make contact of relay XD and magnet X to (−). The upper winding of relay XD is connected in multiple with magnet X so that the impulse or impulses applied to magnet X are effective to hold relay XD operated until the end of the digit. This is because relay XD is slow to release and will not drop away during the intervals between the impulses transmitted to the X magnet. Condenser and resistor 16RS connected to the windings of the X magnet and the XD relay are for absorbing the spark at the impulse contacts of the CB relay. When relay CB is energized at the end of the impulse, the X magnet and the upper winding of relay XD are de-energized. Since the lower winding of relay XD is opened at contact 1XON when the switch takes its first step off normal, this relay will release at the termination of the impulse transmission, thus leaving the switch wipers at the first level in response to the transmission of a single impulse for the first digit.

Since this is a digit canceling level, the first selector is released by means of a circuit which may be traced from (+), lowermost make contact of relay RD, lowermost break contact of relay XD, X off normal contact 2XON, level wiper XX and the first terminal thereof, wire W, make contact of relay RD, break contact of relay SW, X off normal contact 3XON and winding of magnet Z to (−). Magnet Z operates to restore the switch to normal and it closes a locking circuit for itself which is effective until the switch reaches normal, this circuit being traced from (+), make contact of magnet Z, make contact of relay RD, break contact of relay SW, contact 3XON and winding of magnet Z to (−). When the switch reaches normal, the circuit to magnet Z is opened for de-energizing this magnet and the previously described circuit for relay XD is completed at contact 1XON, thus energizing the XD relay for placing the selector circuit in exactly the same condition as when it was seized, as previously described.

It will now be assumed that two impulses are transmitted for the next digit and that this is not a digit canceling level, as marked by the connection of wire M to the second terminal of the XX bank. The release of relay CB at the beginning of the first impulse closes the previously described circuits for operating magnet X and for holding relay XD. When relay CB operates at the end of this impulse transmission, magnet X and the upper winding of relay XD are de-energized, thus advancing the switch to level 1 and, since the CB relay will be again released to mark the beginning of the second impulse of the digit, relay XD does not have time to release and its upper winding as well as magnet X are again energized to advance the switch to the second level and to hold the XD relay operated. Now when relay CB operates at the end of the second impulse, relay XD is de-energized long enough to permit it to release and magnet X to de-energize, thus leaving the switch at the second level.

Relay HA is now operated over a circuit which may be traced from (+), make contact of relay RD, break contact of relay XD, off normal contact 2XON, XX wiper and its second terminal, wire M, break contact of Y off normal contact 1YON, winding of relay HA, resistor 14RS, break contact of relay HA and break contact of magnet Z to (−). Since resistor 15RS is short-circuited at this time, relay HA is energized at a comparatively high level to cause it to quickly operate and when it is operated, resistor 15RS is inserted in the circuit of the HA relay winding to reduce the level of its energization to a comparatively low value. The operation of relay HA closes a locking circuit for itself which may be traced from (+), lowermost make contact of relay RD, break contact of relay SW, make contact of relay HA, break contact of magnet Y and winding of relay HA to (−) at the break contact of magnet Z. At this same time a circuit is closed for energizing magnet Y which may be traced from the previously described (+) and through another make contact of relay HA and the winding of magnet Y to (−). The operation of magnet Y opens up the above described circuit for relay HA for releasing this relay, which in turn opens up and releases magnet Y, thus leaving the switch at the first terminal in the selected level.

It will now be assumed that this first terminal is busy as marked by (+) potential on the terminal to which wiper SS of the selector is connected. This (+) on the busy terminal extends back through the lowermost break contact of relay SW, make contact of relay RD, break contact 3OF of the overflow spring combination, break contact of magnet Y and winding of relay HA to (−) at the break contact of magnet Z. This operates and locks relay HA as before for again operating magnet Y, which in turn opens up and releases relay HA for in turn opening up and releasing magnet Y, thus leaving the selector in contact with the second set of terminals in the selected level. This same circuit by way of wiper SS is effective to operate the HA relay and the Y magnet in the previously described manner for advancing the selector switch to the first idle trunk. During this selecting operation of the first selector, the upper winding of relay SW is short-circuited to prevent its operation as long as busy trunks are being tested. This short circuit may be traced from (+) on the terminal to which wiper SS is connected, break contact of relay SW and make contact of relay RD to the right hand terminal of the upper winding of relay SW. Or, while the switch is moving from one terminal to another, (+) is applied to the right hand terminal of the upper winding of relay SW from (+), lowermost make contact of relay RD, break contact of relay SW, make contact of relay HA, overflow contact 3OF and terminal of the SW relay. (+) is applied to the left hand terminal of this winding of the SW relay over a circuit extending from (+), lowermost make contact of relay RD, lowermost break contact of relay XD, contact 2XON, wiper XX and its associated terminal, wire M, make contact 1YON and left hand terminal of the SW relay.

Figure 5:
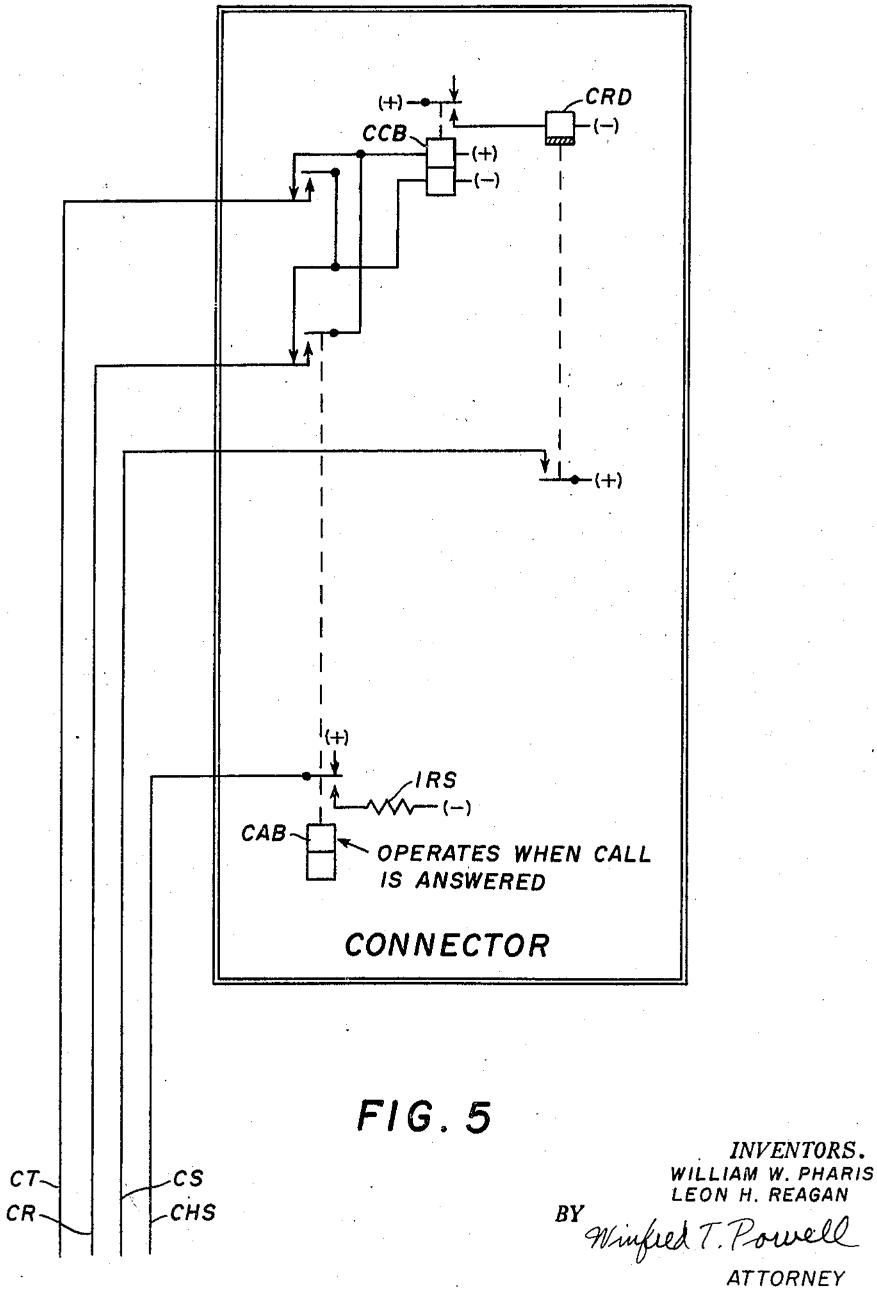
Fig. 5 illustrates only a sufficient amount of a connector circuit for a description of the operation of the coin control circuits when the call is extended to a connector and when the call is answered.

When the idle trunk is reached and relay HA releases, there is no circuit to (+) on the terminal to which SS is connected for again operating the HA relay. Furthermore, the absence of (+) on wiper SS removes (+) from the right hand terminal of the upper winding of SW, thus removing the above described short circuit of the winding so that the SW relay is operated by way of a circuit which may be traced from (+), lowermost make contact of relay RD, lowermost break contact of relay XD, off normal 2XON, XX wiper and its associated terminal, wire M, make contact 1YON, upper winding of relay SW, contact 3OF, break contact of magnet Y and winding of relay HA to (−) at the break contact of magnet Z. Relay SW operates and extends the calling line by way of its make contacts and wipers ST and SR to the selected trunk for operating the CB relay of this trunk circuit. It will first be assumed that the connector shown in Fig. 5 is selected, consequently relay CCB will be energized over the calling line circuit for operating relay CRD and this relay in turn applies (+) potential back over conductor CS and wiper SS for completing a locking circuit for the SW relay before relay RD of the selector releases and opens the circuit to (+) at its lowermost make contact. This locking circuit may be traced from the SS wiper of the selector, lowermost make contact of relay SW, break contact of relay XD and over the previously described circuit including conductor M to the upper winding of relay SW. This locking circuit is also extended back over conductor S through the adapter to the line finder and line circuits for holding these circuits in their operated conditions. The operation of relay SW opens up and releases relay CB for in turn opening up and releasing relay RD.

The calling party now dials the remaining digits into the connector circuit, but since this connector circuit may be any one of those well known in the art, the details are not shown or described. It is only necessary to point out that relay CAB of the connector operates in the well known manner when the called party removes the receiver in response to the ringing signal. Relay CAB reverses the battery feed through the windings of relay CCB back over the preceding circuits to the calling station for supervision if the call is from a manual board or for meter operation if the calling line is a metered line. It will be noted that relay CAB of the connector switches the CHS conductor from (+) to (−). Since this is assumed to be a call from a non-paystation line, this switch in potential on the CHS conductor is ineffective since this conductor leads to an open circuit at the uppermost make contact of relay SD of the adapter.

When the called party hangs up the receiver at the termination of the conversation, relay CAB is released to restore the battery feed to the calling station to normal for supervision and when the calling party hangs up the receiver, relay CCB of the connector releases to open up and release the associated CRD relay. The release of relay CRD disconnects (+) from sleeve conductor CS leading back through wiper SS of the first selector for opening up the locking circuit of the SW relay and effecting the release of this relay. This open circuit condition of the CS conductor disconnects holding potential from the S conductor leading back through the adapter to the finder and line circuits for restoring these circuits to normal. The release of relay SW of the selector closes a circuit for the selector release magnet Z which may be traced from (+), uppermost break contact of relay RD, break contact of relay SW, off normal contact 3XON and winding of magnet Z to (−). Magnet Z restores the selector switch to normal and disconnects (−) from the HA and SW relays to prevent any false operation of either one of these relays as the SS wiper of the selector is passing over busy or grounded contacts in its travel back to normal. Magnet Z also closes a circuit for operating relay XD which may be traced from (+), make contact of magnet Z, break contact of relay RD and lower winding of relay XD to (−). Relay XD applies (+), at its lowermost make contact, to conductor S leading back through the adapter to the associated line finder for making this circuit busy or non-selectable until the selector switch is completely restored to normal, at which time magnet Z releases to open up and release relay XD, which in turn disconnects (+) from the above described circuit to sleeve conductor S for rendering the circuit again selectable. Although the circuits of the line finder for effecting this busy or non-selectable condition, with (+) applied to the sleeve conductor, are not shown in detail they will be well understood by those skilled in the art.

*Call from paystation line.—Coin collect*

When the calling paystation line, illustrated in Fig. 1, is extended through the line finder to the adapter-first selector circuit, relay PS of the adapter circuit is energized to mark this calling line as a paystation line. The circuit for operating relay PS may be traced from (+), terminal and wiper HSF of the line finder, conductor 118, break contact of relay CC, conductor 101, break contact of relay SR and winding of relay PS to (−). It will be understood that, in the previous call, relay PS was not operated because there is no connection to (+) at a line circuit associated with a non-paystation line. Relay CB of the adapter is now energized over a circuit which may be traced from (+), winding of impedance coil CT, upper winding of relay CD, make contact of relay PS, break contact of relay RV, conductor 102, break contact of relay CC1, conductor 112, wiper TF of the line finder and over the calling line and substation circuits in series, back over the other side of the calling line and wiper RF of the line finder, conductor 113, break contact of relay CC1, conductor 103, break contact of relay RV, make contact of relay PS, lower winding of relay CD and winding of relay CB to (−). Relay CB closes an operating circuit for relay RD extending from (+), make contact of relay CB, break contact of relay SS and winding of relay RD to (−). Relay RD closes a locking circuit for itself extending from (+), make contact of relay CB, make contact and winding of relay RD to (−). It will be understood that the impulses received by relay CB of the adapter are at such a rate that the intermittent de-energization of the RD relay is insufficient to effect the release of this relay because of its slow acting characteristics.

Figure 2:
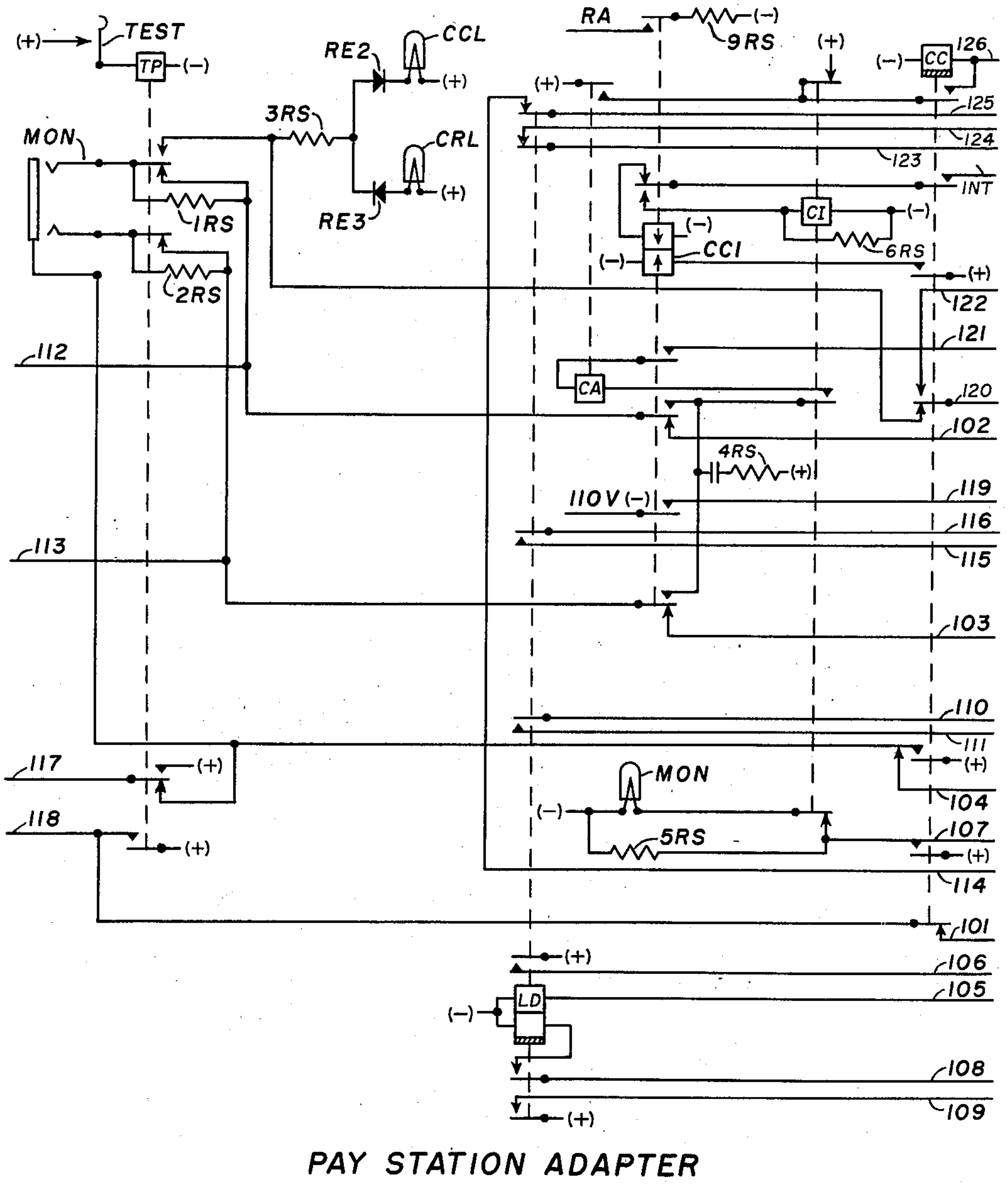
Figure 3:
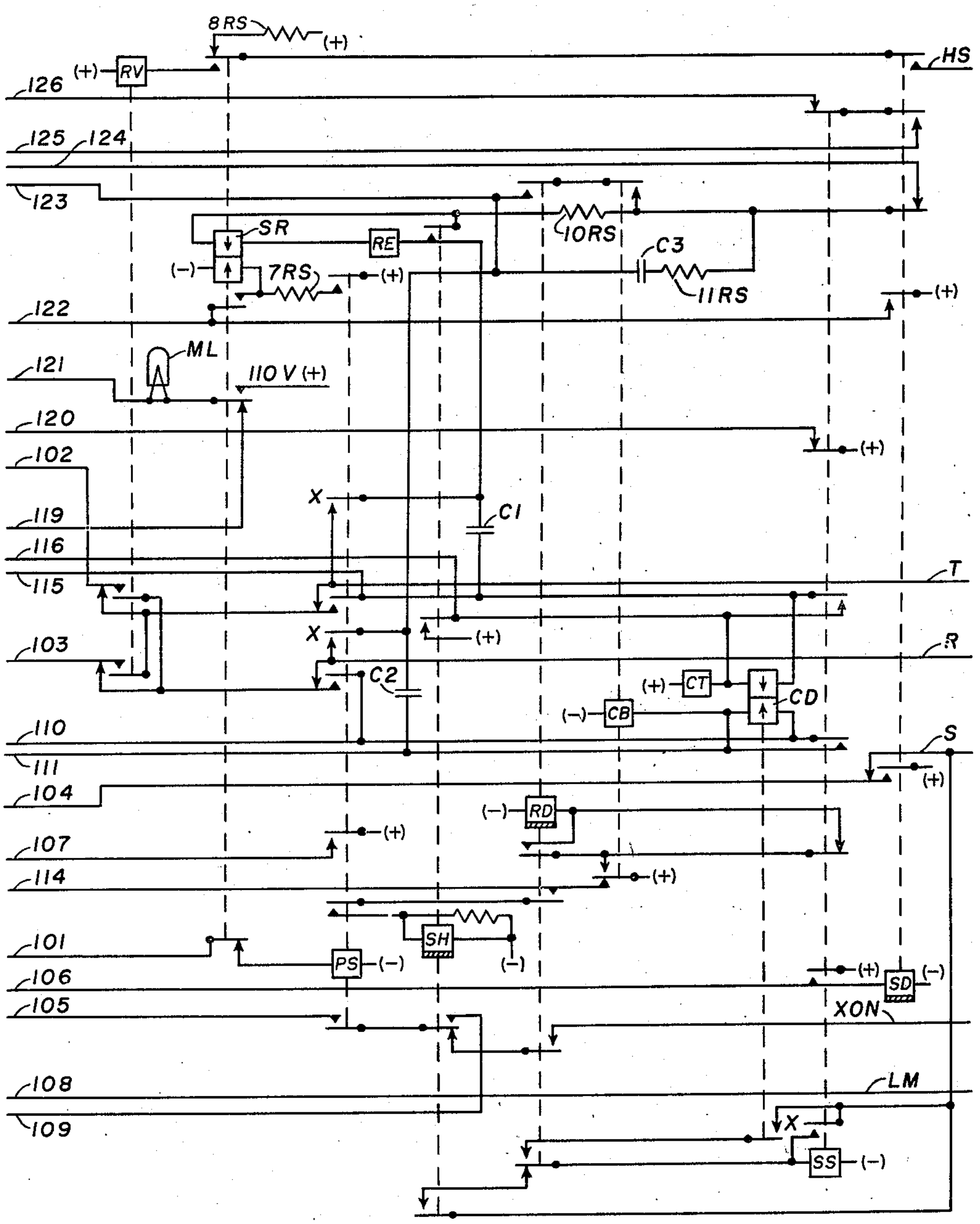

The incoming sleeve conductor 117 is connected to (+) at the lowermost make contact of relay RD (Fig. 4) by way of conductor S and break contacts of relays SD and CC, including conductor 104 and break contact of relay TP for holding and make busy purposes as is well known. Relay CB of the selector is operated over a circuit which may be traced from (+), normally closed overflow contact 2OF, break contact of relay XD, upper winding of relay CB, break contact of relay SW, conductor T, X make contact of relay PS (the X contacts of this relay making before any other contact of the relay is shifted), winding of impedance coil RE, upper winding of relay SR, resistor 10RS, make contact of relay CB, make contact of relay RD, X make contact of relay PS, conductor R, break contact of relay SW and lower winding of relay CB to (−). In connection with this operation of the CB relay of the selector, it will be noted that the calling line, including conductors 102 and 103, is extended through to conductors T and R leading to the selector before the PS relay operates. Consequently, the CB relay may be operated over a circuit including the calling line before the PS relay operates and after the operation of this latter relay, the CB relay of the selector is energized through a circuit local to the adapter. Relay CB of the selector closes an obvious circuit for operating the associated RD relay and this relay in turn closes the previously described circuit for operating the associated XD relay. Relay LD of the adapter is now operated over a circuit which may be traced from (+), break contact 1XON of the selector off normal, make contact of relay RD, conductor XON, make contact of relay RD of the adapter, break contact of relay SH, make contact of relay PS, conductor 105 and upper winding of relay LD to (−). Relay SD of the adapter is now operated over a circuit which may be traced from (+), make contact of relay LD, conductor 106 and winding of relay SD to (−). The operation of relay SD of the adapter shifts the energization of the incoming sleeve conductor 117 (including conductor 104) from (+) at the lowermost make contact of relay RD of the selector to (+) at the inner upper make contact of relay SD of the adapter. Monitor lamp MON of Fig. 2 is now energized as an indication that the adapter circuit has been seized and that the call has not been answered, this circuit being traced from (+), make contact of relay PS, conductor 107, break contact of relay CI and lamp MON to (−).

The detailed operation of the selector is the same as previously described and need not be repeated at this time, it being understood that digit canceling may be effected from a calling paystation in the same manner as from a regular line. It will now be explained how these circuits function when the first digit is dialled without a coin being deposited at the paystation. The second and third upper make contacts of the LD relay short-circuit the two windings of the CD relay to remove the impedance of these windings from the dialling circuit. The purpose of the LD relay is to permit dialling a first digit without the deposit of a coin. When the CB relay of the adapter releases in response to the beginning of the first impulse of the digit, relay SH is operated over a circuit which may be traced from (+), break contact of relay CB, make contact of relay RD, make contact of relay PS and winding of relay SH to (−). Since the uppermost make contact of relay CB repeats the impulses from the adapter to the selector, it is advisable to remove the impedance of coil RE and the upper winding or relay SR from the circuit leading to the selector. This is accomplished by the closure of the uppermost make contact of relay SH which short-circuits these two coils during impulsing. At the end of the digit, relay CB remains energized long enough to open up the above described circuit to relay SH sufficiently long to permit the release of this latter relay. The operation of relay SH closes a locking circuit for relay LD for holding this relay operated until the end of the impulse transmission for the first digit, this circuit being traced from (+), lowermost make contact of relay LD, conductor 109, make contact of relay SH, make contact of relay PS, conductor 105 and upper winding of relay LD to (−). This locking circuit is necessary because the original operating circuit for relay LD is opened when the first selector switch takes its first step away from normal and removes (+) from conductor XON at contact 1XON.

The impulses received by relay CB of the adapter are repeated to the selector over a circuit which may be traced from (+), make contacts of relay XD, upper winding of relay CB, break contact of relay SW, conductor T, make contact of relay PS, make contact of relay SH, resistor 10RS, make contact of relay CB, make contact of relay RD, make contact of relay PS, conductor R, break contact of relay SW and lower winding of relay CB to (−). Consequently, the impulses received by the CB relay of the adapter are repeated by the uppermost make contact of this relay into the CB relay of the selector for advancing this switch in the previously described manner. It will be obvious that relay SH applies (+) to the connection between the CT and CD coil windings, thus short-circuiting coil CT for removing the impedance of this coil from the line circuit during dialling.

When the dial stops and relay SH of the adapter releases, coil CT is again included in the line circuit and the locking circuit for relay LD is opened for effecting the release of this relay, which in turn opens up and releases relay SD. It will thus be seen that a first digit can be dialled for selecting an operator in emergency cases without the deposit of a coin. If the dial is operated after the first selector makes its selection in an attempt to extend a connection beyond the trunk selected, with no coin deposited at the calling station, the impulses transmitted from the dial will be effective to impulse relay CB in the previously described manner but these impulses will not be repeated from the adapter to the selected trunk. This is because there is a closed circuit across the uppermost make contact of relay CB, thus rendering this contact ineffective to transmit impulses. This closed circuit may be traced from the uppermost make contact of relay CB, make contact of relay RD and over the previously described circuit to the R trunk. A branch of this circuit may be traced through a break contact of relay LD, over conductors 123 and 124, break contact of relay SD, winding of coil 10RS, upper winding of relay SR, coil RE (these two latter coils being short-circuited when relay SH operates) and over the previously described circuit including the X contact of relay PS to conductor T, thus providing a closed circuit across the T and R conductors which is independent of the impulsing contact of the CB relay.

When the SD relay of the adapter releases, the incoming sleeve conductor 117 is transferred from (+), at a make contact of relay SD, back to (+) on conductor S which is now extended through wiper SS of the first selector to the selected trunk. It will be observed that both windings of the CD relay are included in the paystation line circuit when an attempt is made to dial an additional digit without the coin and that the operation of relay SH increases the current through the upper winding of relay CD, but since this upper winding is included in the line circuit, a corresponding increase in current will be effective through the lower winding of relay CD and since these windings are differentially wound, the relay will not be operated.

After the release of relay LD of the adapter a coin is required at the paystation before additional digits can be dialled. It will be understood that this coin may be deposited either before or after dialling the first digit. With the coin in the chute in the paystation, a circuit is closed from ground, through the polar relay at the paystation, make contact closed by the coin, T line conductor and over the previously described circuit through the upper winding of relay CD and the winding of coil CT to (+) or ground. This upsets the balance of the circuit through the CD relay windings and permits the relay to operate for closing a circuit for operating relay SS traced from (+) on sleeve conductor S, make contact of relay CD, make contact of relay RD and winding of relay SS to (−). Relay SS closes a locking circuit for itself at its X contact which is independent of the CD relay contact for maintaining relay SS operated after relay CD is released. Relay CD releases when relay SS operates because the latter relay closes two make contacts which short-circuit both windings of the CD relay. Relay SD of the adapter is again operated over a circuit to (+) at a make contact of relay SS for again switching the sleeve conductor leading back to the line finder from the sleeve leading ahead to the selected trunk to (+) at a make contact of relay SD.

Recalling that the CCB and CRD relays of the connector are operated when the first selector seizes the trunk to the connector, it will be obvious that the following digits are repeated to the connector by the uppermost make contact of relay CB of the adapter when this latter relay receives the impulses of the succeeding digits from the dial. Relay SD is operated at this time, consequently the above described disabling circuit across the uppermost make contact of relay CB is opened at the break contact of relay SD.

It will next be assumed that the first digit dialled advances the first selector to a level where the Q wire is connected to the terminal of the X wiper associated with this level. This Q wire is for the purpose of permitting paystation lines to call by way of certain levels of the first selector without the deposit of a coin. Consequently, when such a level is selected, (+) by way of wire Q and wiper X extends back by way of conductor LM, make contact and lower winding of relay LD to (−) for locking this relay operated, thus preventing its release following the first digit as previously described. With relay LD operated, relay SD is held operated. Consequently, relay LD short circuits both windings of the CD relay and relay SD removes the bridge from the impulse contacts of the CB relay, thus permitting the CB relay to repeat additional digits to the selected circuits in the previously described manner, without the deposit of a coin.

Referring back to the previously described operation where a coin was deposited and a line was selected through the connector circuit of Fig. 5, it will now be explained how the coin collect operation is effected. It will be recalled that, since relay PS is operated, the calling line conductors are extended to battery feed coils CT and CB of the adapter and that the outgoing trunk line conductors extend to battery feed coil CCB of the connector, with the closed circuit across these trunk conductors being established by way of coils RE and SR and resistor 10RS in series with uppermost make contacts of relays CB and RD of the adapter. Now when the call is answered, relay CAB of the connector (this relay being the battery feed relay to the called line) operates for reversing battery back to coils RE and SR of the adapter. This reverse in battery flow back over the trunk conductors reverses the energization of the upper winding of relay SR, thus energizing both windings of this relay in series aiding relation for causing the relay to operate. The operation of relay SR closes a locking circuit for itself extending from (+), make contact of relay SD, make contact and lower winding of relay SR to (−). This locking circuit energizes the lower winding of the SR relay in a circuit which excludes resistor 7RS, thus the SR relay will remain locked in its operated position if and when the current flow to conductors CT and CR at the connector is restored to normal direction by the called party hanging up the receiver.

Relay SR opens up and releases relay PS and this relay in turn switches the calling line conductors from coils CT and CB of the adapter to the trunk conductors T and R extending through to the connector circuit. This is effective to de-energize and release relay CB which in turn opens up and releases relay RD of the adapter. The release of relay PS also de-energizes the monitor lamp circuit to extinguish this lamp as an indication that the call has been answered.

The operation of relay CAB in the connector also switches the CHS conductor from (+) to (−) for energizing relay RV in the adapter over a circuit which may be traced from (+), winding of relay RV, make contact of relay SR, make contact of relay SD, conductor HS, make contact of relay SW, wiper SHS and its associated terminal, make contact of relay CAB of the connector and resistor 1RS to (−). The tip side of the calling line is grounded by way of the polar coin control magnet at the paystation and the reversal of the battery in the connector connects the (−) side of relay CCB to the tip line. Consequently, if the battery is left in this condition out over the calling line circuit, hanging up the receiver at the calling station will fail to release the connection because the ground at the paystation will hold the CCB relay of the connector in its operated position. To overcome this condition, the operation of relay RV of the adapter reverses the line conductors again at this location, thus connecting the grounded tip line conductor of the calling station by way of the ring conductor leading to the connector and thence to the upper winding of relay CCB which is connected to ground. Consequently, hanging up the receiver at the calling telephone under this condition opens up the side of the line extending to the (−) or battery side of coil CCB of the connector so that the connection will be released. If the called party hangs up first, relay CAB of the connector restores the battery feed back to the adapter to normal and de-energizes conductor HS for releasing relay RV of the adapter for reversing the line conditions, which again permits the release of relay CCB of the connector when the calling party hangs up, by opening up the side of the line to which this battery connection is established.

Assuming that the called party has replaced the receiver for releasing relay CAB, now when the calling party hangs up the receiver, relay CCB of the connector will be released by the opening of the calling line circuit and relay RV of the adapter will be released by the disconnection of (−) from the HS conductor which leads to the RV relay. The release of relay CCB in the connector opens up and releases the associated CRD relay for releasing the connector switch and for disconnecting (+) from sleeve conductor CS. This de-energizes relay SW of the selector and the release of this relay closes the previously described circuit to the selector release magnet Z for restoring the selector to normal.

The de-energization of the sleeve conductor, which releases relay SW of the selector, also removes (+) from sleeve conductor S leading back to the adapter for releasing relay SS. The release of relay SS opens up and releases relay SD. The release of relay SS also closes a circuit for operating relay CC which may be traced from (+), break contact of relay CB, conductor 114, break contact of relay LD, conductor 125, make contact of relay SD, break contact of relay SS, conductor 126 and winding of relay CC to (−). Relay CC closes a locking circuit for itself extending from (+), break contact of relay CI, make contact and winding of relay CC to (−). Relay CC also closes a substitute locking circuit for relay SR to be effective after relay SD releases, this substitute locking circuit extending from (+), break contact of relay SS, conductor 120, make contact of relay CC, conductor 122, make contact and lower winding of relay SR to (−). After relay CC operates, relay CC1 is energized if, at this time there is no pulse on common interrupter conductor INT. If there is a pulse on this INT conductor at this time, both windings of relay CC1 are energized in opposition to prevent its operation until the pulse has terminated. This is to prevent the closure of the circuit from the INT common to the CI relay during a short pulse interval which might fail to fully operate the CI relay. When this INT conductor is de-energized, relay CC1 is energized from (+), make contact of relay CC and lower winding of relay CC1 for causing the CC1 relay to operate.

The circuit is now in condition awaiting the next pulse on conductor INT, this pulse being effective to operate relay CI over a circuit extending from conductor INT, make contact of relay CC, make contact of relay CC1 and winding of relay CI to (−). Relay CA is now operated over a circuit including the coin collect battery 110V (+), make contact of relay SR, lamp ML, conductor 121, make contact of relay CC1, winding of relay CA, make contact of relay CI, make contacts of relay CC1 and over both sides of the calling line to the coin control magnet in the calling paystation. This 110 v. (+) is connected to the calling line until the end of the pulse on conductor INT which releases relay CI and opens up the above described circuit including the coin collect battery. It will first be assumed that this first application of coin collect battery is ineffective to collect the coin. Consequently, the release of relay CI establishes the above described locking circuit for relay CC for preventing the release of this latter relay. While the coin collect battery is being applied to the calling line, the operation of relay CA also applies (+) to the locking circuit of relay CC. During the interval between the operation of relay CI and the removal of (+) at its break contact from the CC locking circuit and the operation of relay CA for again completing this locking circuit, relay CC is prevented from releasing because of its slow acting characteristics.

Since it was assumed that the coin was not collected at this first application of coin collect battery, the next time conductor INT is pulsed, relay CI is again operated for applying 110 v. (+) to the calling line, which again operates relay CA and operates the coin collect apparatus at the calling station. It will be assumed that the coin is collected this time, consequently when the INT conductor is de-energized, relay CI releases to open up the coin collect circuit to the calling line and for releasing relay CA. Relay CC is again locked to (+) at the uppermost break contact of relay CI, but this time when conductor INT is pulsed and relay CI is operated to open up the uppermost break contact of this relay, relay CC is released because there is no circuit to ground at the substation for energizing relay CA. Consequently, relay CC has time to release and open up the circuit to relay CC1 for effecting the release of this relay. Relay CI releases when the pulse on conductor INT is terminated and relay SR is released when relay CC releases to open its above described locking circuit. During the time that relay CC is operated, during this coin control operation, incoming sleeve conductor 117 is energized at a make contact of relay CC for holding the circuits in connection with the adapter and when relay CC releases, this incoming sleeve conductor is de-energized for restoring the finder and line circuits to normal. All circuits are now in normal condition ready to be used on another call. Monitor lamp MON is energized by way of a make contact of relay CC and a break contact of relay CI so that this lamp is intermittently lighted during the above described release operations of relay CI as a visual indication that coin control operations are being effected. The release of relay CC opens up the MON lamp circuit.

*Call from paystation line.—Coin return*

It will now be explained how the circuits function when the call has not been answered so that it is necessary to return the coin at the calling station. In this connection, all of the previously described operations are the same up to the point where relay CAB of the connector was operated in response to the answering of the call. In this instance, relay CAB will not be operated because the call is not answered. At this point in the sequence of operations, relays PS, CB, RD, SD and SS of the adapter and relays CCB and CRD of the connector are in their operated positions. Relays LD, SH, CD, SR, RV, CC, CC1, CI and CA of the adapter and relay CAB of the connector are in their de-energized or non-operated positions. Since this call is not answered by the called party, the next thing that happens is the clearing out of the connection by the calling party. Since relay PS of the adapter is operated at this time, the battery feed to the calling line extends through the windings of coils CT and CB, while the closed circuit to the connector is completed at the uppermost make contact of relay CB, resistance 10RS and coils RE and SR. Now when the calling party hangs up the receiver, relay CB is released for opening up and releasing relay RD. The release of relay CB opens up the trunk leading to the connector for effecting the release of the CCB and CRD relays and the release of the connector switch in the previously described manner. The release of relay CB of the adapter closes a circuit for operating relay SH extending from (+), break contact of relay CB, make contacts in series of relays RD and PS and winding of relay SH to (−). When relay RD releases, this circuit to relay SH is opened for effecting the release of this relay, this momentary operation of the SH relay being of no effect at this time.

When the outgoing sleeve conductor S is de-energized by the release of the connector, the locking circuit for relay SS is opened for effecting the release of this relay. A circuit is now closed for operating relay CC extending from (+), break contact of relay CB, conductor 114, break contact of relay LD, conductor 125, make contact of relay SD, break contact of relay SS, conductor 126 and winding of relay CC to (−). Relay SD releases, but only after a comparatively long time interval, due to its slow acting characteristics. The operation of relay CC opens up and releases relay PS and also closes a circuit through the lower winding of relay CC1, for operating this latter relay. Relay CC is locked over a circuit extending from (+), break contact of relay CI, make contact and winding of relay CC to (−). When common conductor INT is pulsed, following the operation of the CC and CC1 relays, relay CI is operated over the previously described circuit. 110 v. (−) coin return battery is now applied to the calling line over a circuit extending from common conductor 110V, (−), make contact of relay CC1, conductor 119, break contact of relay SR, lamp ML, conductor 121, make contact of relay CC1, winding of relay CA, make contact of relay CI, make contacts of relay CC1 and over the conductors of the calling line to ground through the polar relay at the paystation. This circuit operates relay CA and in this example it will be assumed that the coin is disposed of at the first application of the coin return battery to the calling line. Consequently, when the pulse on conductor INT is terminated, relay CI releases for opening up and releasing relay CA at the time the 110 v. (−) is removed from the calling line. With the coin disposed of at this first application of coin return battery, the circuit to ground through the polar magnet at the substation is opened. Consequently, the next pulse on conductor INT operates relay CI but relay CA is not operated at this time because of the open circuit at the paystation.

Coin control relay CC is de-energized at the time of the operation of the CI relay, this CC relay holds over until relay CA operates to again complete the CC relay locking circuit due to the slow acting characteristics of the latter relay. At the time relay CI operates, when there is no circuit to ground at the substation and relay CA is not operated, the locking circuit for relay CC is opened long enough to permit this relay to release and in turn open up and release relay CC1. Relay CI is released at the termination of the pulse on conductor INT.

During this coin return operation, incoming sleeve conductor 117 is maintained energized at the make contact of relay SD of the adapter until the release of this relay. Before relay SD releases, the operation of relay CC switches conductor 117 to (+) at a make contact of this latter relay, thus holding the preceding circuits until the coin return operation has been completed as indicated by the release of the CC relay, which de-energizes conductor 117 for releasing the preceding switches and restoring all circuits to normal. Monitor lamp MON is energized over an obvious circuit as long as relay PS is operated and, after the release of relay PS over a circuit extending through a make contact of relay CC and a break contact of relay CI. Since relay CI is intermittently operated until the coin is actually disposed of, lamp MON is intermittently energized, thus giving a flashing indication of the coin control operation.

*Call from paystation line to CLR trunk*

Figure 6:
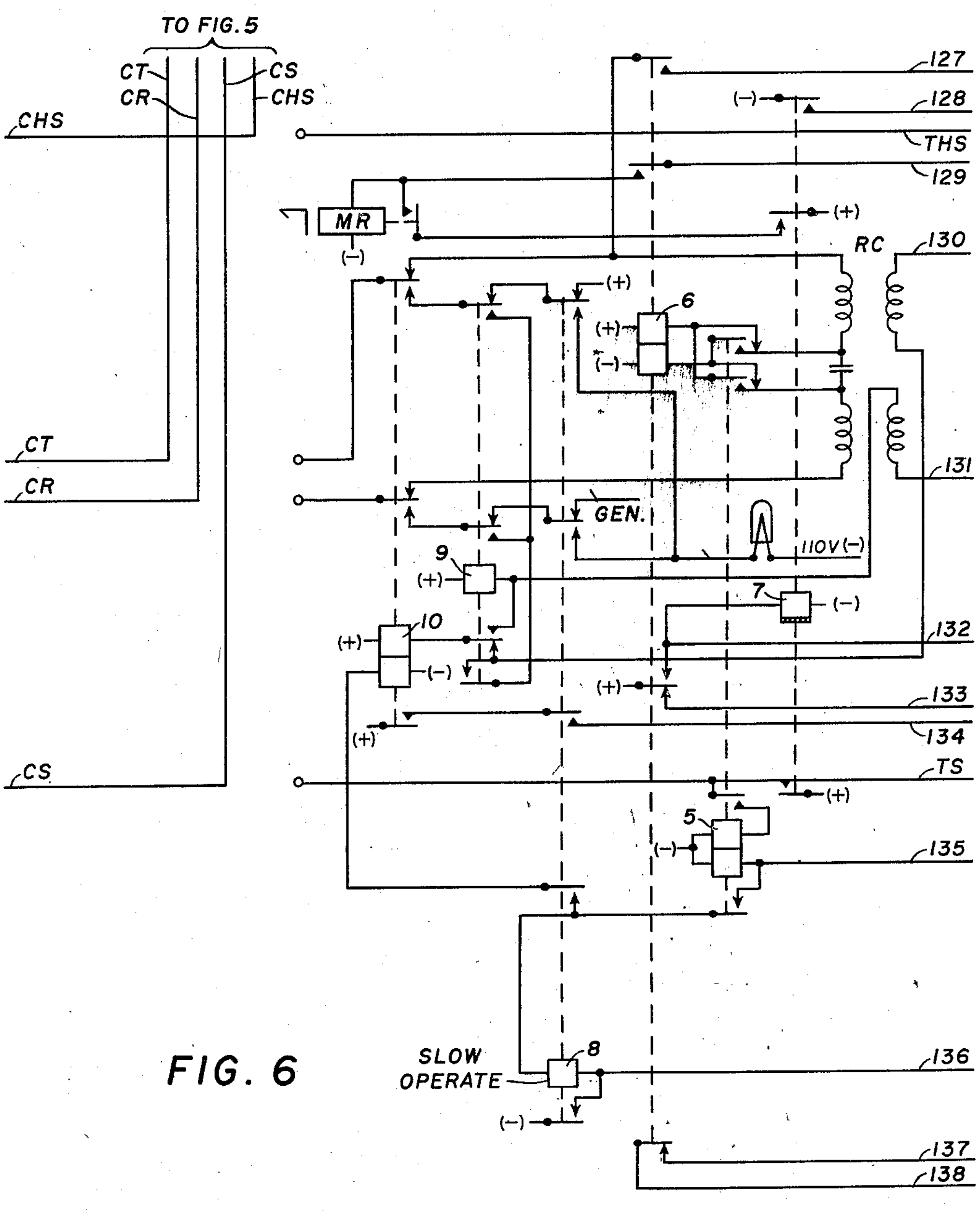
Figs. 6 and 7 illustrate a CLR trunk circuit to which a calling substation may be extended by dialling the proper level at the illustrated first selector.
Figure 7:
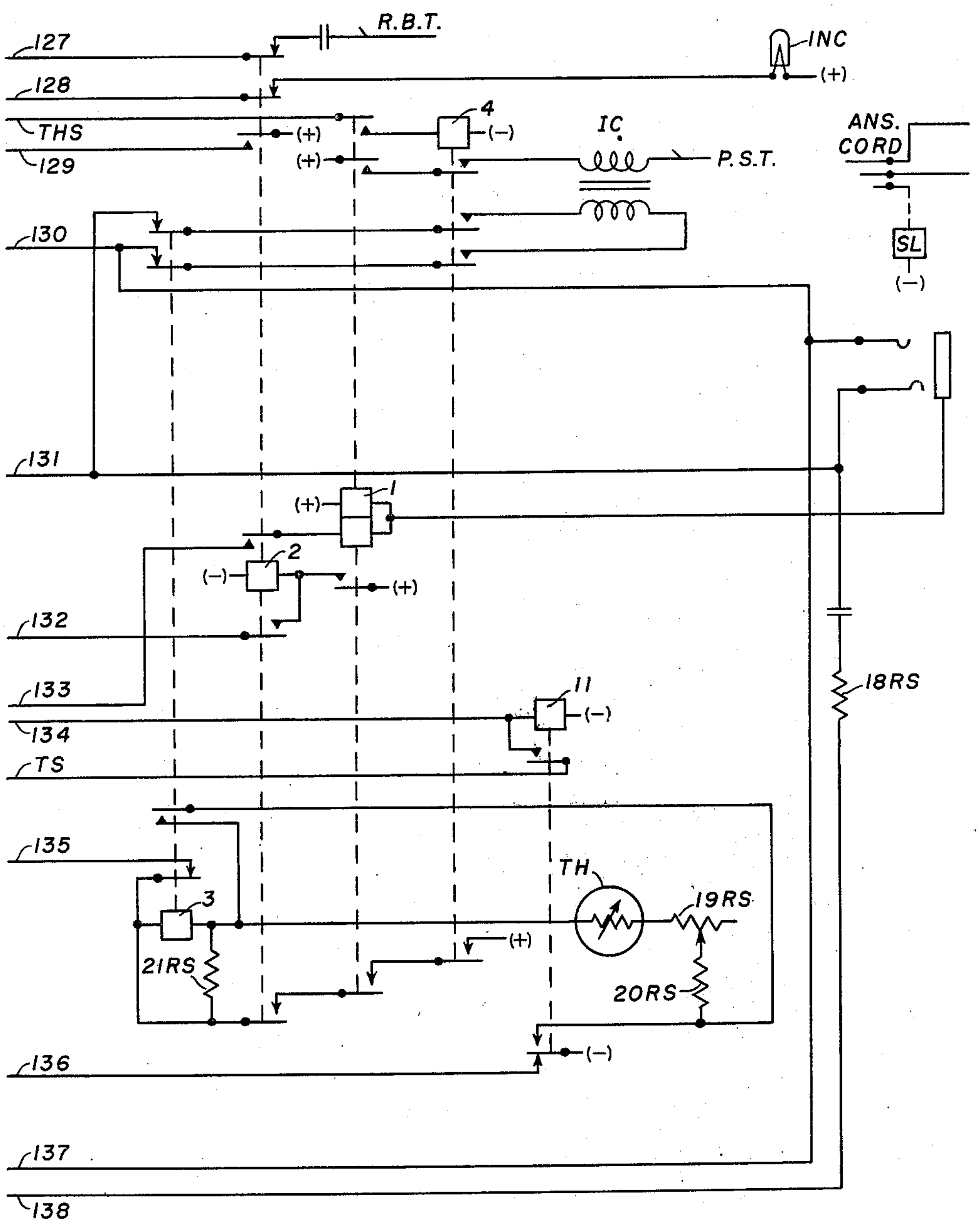

When a paystation line dials the proper level in the selector switch for selecting the CLR trunk, relay PS of the adapter is operated and the closed circuit across the ST and SR wipers is supplied through the uppermost make contact of relay CB of the adapter, all in the previously described manner. This closed circuit extends through the left hand windings of repeating coil RC (Fig. 6) and break contacts of relay 5 to the windings of the battery feed coil 6, which energizes this relay. Ring back tone is now applied to the calling line as an indication that the trunk is being signaled, this tone circuit being traced from common conductor RBT, condenser, break contact of relay 2, conductor 127, make contact of relay 6, break contact of relay 10 and over wiper ST to the calling line. Relay 6 closes a circuit for operating relay 7 extending from (+), make contact of relay 6 and winding of relay 7 to (—). Sleeve conductor TS is connected to (+) at the lowermost make contact of relay 7 for holding the preceding switches and for making this trunk busy to other calls. Incoming lamp INC is now energized as a calling signal on this trunk by way of a circuit extending from (+), lamp INC, break contact of relay 2, conductor 128 and make contact of relay 7 to (—).

When the operator answers, relay 1 is energized over a circuit extending from (+), upper high resistance winding of this relay, sleeve of jack and sleeve conductor of the cord to (—) through a resistor or a sleeve relay as well known in cord circuits for use on manual switchboards of this type. Relay 1 operates and closes an obvious circuit for operating relay 2, this latter relay closing a locking circuit for itself extending from (+), make contact of relay 6, conductor 132, make contact and winding of relay 2 to (—). The operation of relay 2 disconnects the ring back tone from the calling line and opens up the circuit to lamp INC.

Since it is assumed that the calling line is a paystation line, relay 4 of the CLR trunk is operated over a circuit which may be traced from (+), resistor 8RS of the adapter, break contact of relay SR, make contact of relay SD, conductor HS, make contact of relay SW, wiper and terminal SHS, conductor THS, make contact of relay 1 and winding of relay 4 to (—). Relay 5 is now operated over a circuit which may be traced from (+), make contacts in series of relays 4, 1 and 2, break contact of relay 3, conductor 135 and lower winding of relay 5 to (—). Relay 5 closes a locking circuit for itself extending from (+), make contact of relay 7, make contact and upper winding of relay 5 to (—).

The operation of relay 5 reverses the battery back to the adapter for operating relay SR of the adapter circuit. Relay SR locks itself operated, opens up and releases relay PS, which in turn extends the calling line conductors through to the CLR trunk circuit so that the coin control battery at the CLR trunk circuit can be applied to the line conductors leading to the coin box of the calling station. There is a slight delay in applying the coin control battery to the calling line for permitting the above mentioned relay operations to take place after the call is answered. More particularly, the circuit which energizes the lower winding of relay 5, previously described, extends through the lowermost make contact of relay 5, winding of relay 8, conductor 136 and break contact of relay 11 to (—). Relay 8 is slow to operate and when its operation is effected, a locking circuit is closed for itself including its lowermost make contact which is independent of the circuit to the break contact of relay 11. Relay 10 is now operated over the previously described circuit which energized the lower winding of relay 5, now extending through make contacts in series of relays 5 and 8 and lower winding of relay 10 to (—). Relay 10 opens up the circuit of the calling line extending to relay 6, thus releasing this latter relay. Relay 7 is not released at this time because it is held operated over a circuit extending to (+) at the make contact of relay 1 which holds relay 2 operated.

Coin return battery is now applied to the calling line to return the coin which was needed to enable the calling station to dial through to the CLR trunk. This coin return circuit may be traced from 110V (—) at the CLR trunk, lamp, make contacts of relay 8, break contacts of relay 9, make contacts of relay 10 and over wipers ST and SR to the calling station. With relays 10 and 8 operated, a circuit is closed for operating relay 11 which extends from (+), make contact of relay 10, make contact of relay 8, conductor 134 and winding of relay 11 to (—). Relay 11 closes a locking circuit for itself extending from (+), make contact of relay 7, conductor TS, make contact and winding of relay 11 to (—). A circuit is now closed for energizing relay 3, this circuit being traced from (+), make contacts in series of relays 4, 1 and 2, winding of relay 3, thermistor TH, resistors 19RS and 20RS and make contact of relay 11 to (—). Relay 3 is delayed in its operation until thermistor TH heats up and permits sufficient current to flow therethrough to effect the operation of relay 3. When relay 3 operates it closes a locking circuit for itself by way of its make contact and a make contact of relay 11 which is independent of the circuit through the thermistor. This locking circuit is also effective to short circuit the thermistor for permitting it to restore to normal.

When relay 3 operates, it opens up the above described circuit for relays 10 and 8, thus permitting the release of these relays. The release of relay 10 disconnects the line conductors from the coin return circuit and reconnects them to relay 6 for again operating this relay, which in turn reestablishes the circuit for relay 7. During the interval between the operation of relay 4, in response to the answering of the call by the operator, and the operation of relay 3, paystation tone is applied to the incoming trunk circuit as an indication that the calling line is a paystation line. This circuit may be traced from the source of paystation tone PST, upper winding of induction coil IC, make contacts of relays 4 and 1 to (+). The tone is induced into the lower winding of coil IC and extended through make contacts of relay 4 and break contacts of relay 3 to the incoming trunk conductors. When relay 3 operates, after the above described delay, this paystation tone circuit is disconnected from the trunk circuit.

The operator may ring back on the calling line to recall a party which may have hung up the receiver due to a delay in completing the connection. This is effected in the cord circuit connected to the trunk jack by the application of (—) to the tip side of the circuit. This (—) then extends through the upper right hand winding of coil RC, break contact of relay 9 and upper winding of relay 10 to (+) for operating this latter relay. Generator is now connected back over the calling line by way of a circuit extending from (+), uppermost break contact of relay 8, uppermost break contact of relay 9, uppermost make contact of relay 10, wiper ST and over the calling line and substation circuits, wiper SR, make contact of relay 10, break contact of relay 9 and break contact of relay 8 to the generator common GEN.

Furthermore, the operator can manually collect or refund coins in the paystation by applying 110 v. (+) or 110 v. (—) to the line conductors by way of coin control keys in the cord circuit (not shown).

It will now be assumed that a coin or coins are in the receptable of the paystation to be collected because the desired connection was completed by way of the operator's circuit. This operation is effected automatically when the calling party hangs up the receiver for opening up the line and releasing relay 6 of the CLR trunk. In the first place, the release of relay 6 while relay 2 is held operated, because the plug is still in the jack, connects (+) through the low resistance winding of relay 1 in multiple with its high resistance winding to the sleeve of the jack over a circuit which may be traced from (+), break contact of relay 6, conductor 133, make contact of relay 2, lower winding of relay 1 and sleeve of the jack to the sleeve of the cord connected therewith. This provides supervision in the cord circuit to indicate that the calling party has hung up the receiver. Now when the operator takes down the connection, relay 1 is opened up and released for opening up and releasing relays 2, 3 and 4. Relay 1 also opens up the previously described holding circuit for relay 7 for effecting the release of this relay, which in turn opens up and releases relays 5 and 11.

Since the battery was reversed back to the adapter when the operator answered, as previously described, relay SR is operated and locked and relay PS is in its released position. Furthermore, the adapter circuits were set by the deposit of the coin at the calling station in the previously described manner for effecting the operation of the CD, SS and SD relays in the adapter. Relay CC was locked operated and when relay 7 of the CLR trunk is released to remove (+) from the sleeve holding conductor, the selector is released and relay SS of the adapter is released for effecting the release of relay SD. Before relay SD releases however, the previously described coin collect operation is effected because relay SR is operated for completing the circuit to 110 v. (+) and because relay CC is operated for extending common interrupter INT to the CI relay, thus effecting the coin collect operation over circuits which were previously described. When the coin at the station has been collected, the adapter circuits function to clear out the connection in the previously described manner, thus restoring the circuits to normal. Message register MR of the CLR trunk operates to count the calls established by way of this trunk, its operating circuit being closed when relay 2 operates in response to the operator answering the call. A locking circuit is closed for message register MR extending from (+), make contact of relay 7, make contact and winding of register MR to (−), thus preventing the repeated operation of the register in the event that the calling party retires from the connection and is then resignaled.

*Miscellaneous operation*

Figure 4:
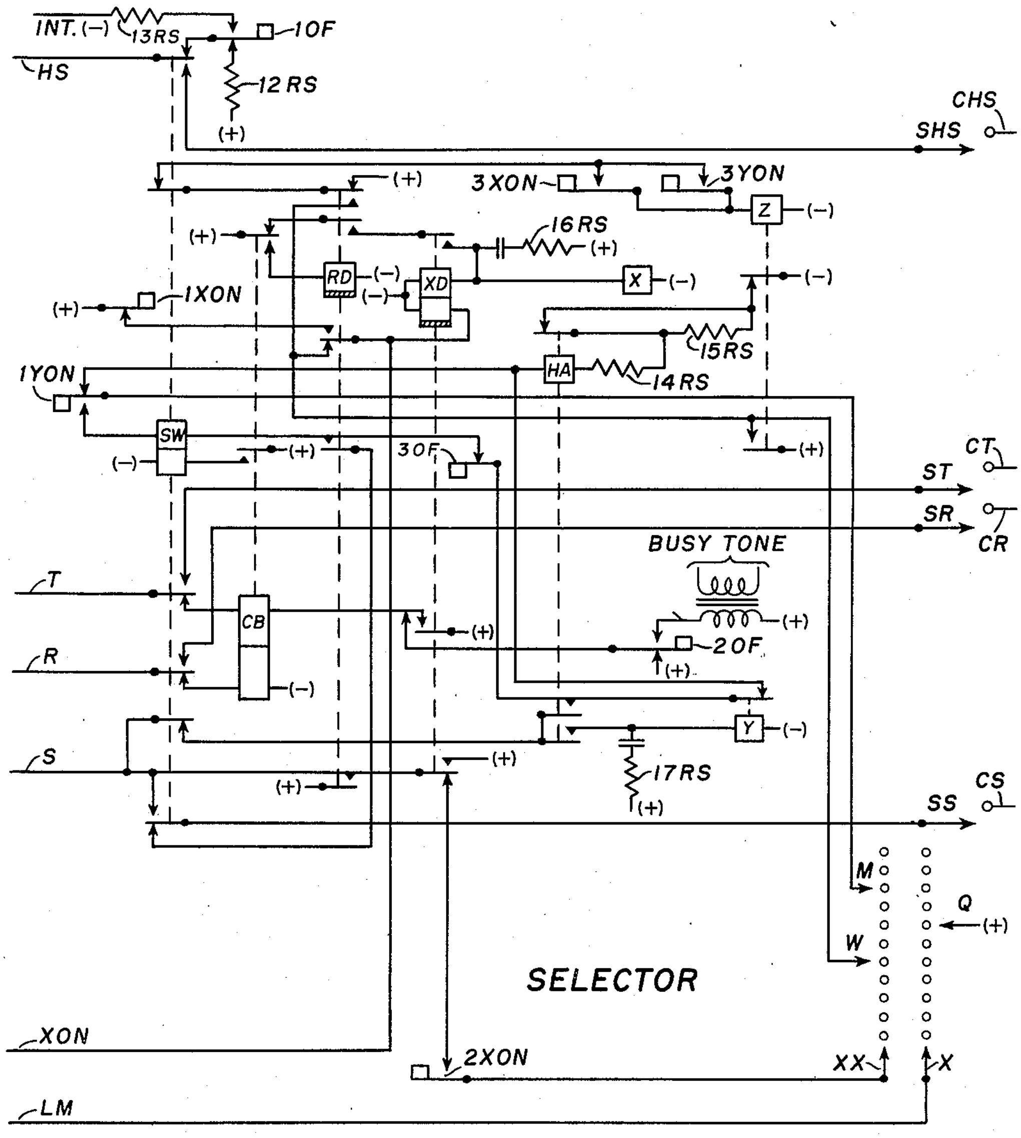

Referring to the selector circuit of Fig. 4, if all trunks in a selected level are busy, the (+) potential found on the SS wiper terminals of these trunks will drive the selector to the last or overflow position. In this position overflow contacts 1OF, 2OF and 3OF are switched. A circuit is closed from the common interrupter INT (−) by way of resistor 13RS, make contact 1OF, break contact of relay SW (this latter relay not being operated because its circuit is opened at contact 3OF), conductor HS, and by way of a trunk circuit (not shown) to an operator's position for providing a flash busy signal in the well known manner. Contact 2OF of the selector switches the upper winding of relay CB from direct (+) to (+) through a common tone induction coil having busy tone induced therein, thus supplying a busy tone signal to a calling line connected to a selector which goes to overflow.

Referring to the paystation adapter, monitor jack MON and the test key are for the purpose of permitting the attendant to route the circuits by means of a test set which is plugged into jack MON, this test set having a calling dial thereon. Operating the test key closes an obvious circuit for operating relay TP for inserting resistors 1RS and 2RS in the tip and ring conductors leading down to line conductors 112 and 113 of the adapter. Restoring the test key releases relay TP for removing these resistors from the circuit, consequently the switch operations may be observed from the calling test dial either with or without a resistance in the line circuit corresponding to various line conditions. Since it requires a ground on conductor 113 from a paystation line to cause the proper operation of the paystation circuits associated with the switching equipment, it is necessary to provide a simulating ground on this circuit when the switches are tested by way of jack MON. This is done by means of a circuit extending from (+), break contact of relay SS, conductor 120, break contact of relay CC, make contact of relay TP, tip of the jack and cord circuit to which the test set is connected, ring of the cord and jack circuit, resistor 2RS, conductor 113, break contact of relay CC1, conductor 103, break contact of relay RV, make contact of relay PS (operated from (+) at the lowermost make contact of relay TP), lower winding of relay CD and winding of relay CB to (−). This circuit to (+) upsets the balance of the CD relay, causing it to operate and effect the previously described relay operations which were effected from ground at the calling substation. It will thus be seen that the circuits can be put through their operations in connection with coin collect and coin refund from the test set, all in the previously described manner. As an indication that coin collect potential is sent back to conductors 112 and 113 during this test, these conductors extend through resistors 1RS, 2RS and 3RS to lamp CCL by way of rectifier RE2, thus lighting lamp CCL if the coin collect potential is properly applied. Rectifier RE3, connected in opposition to RE2, extends through lamp CCL to (+) for lighting this lamp when coin return potential is applied.

Referring to the CLR trunk circuit, the condenser and resistor 18RS connected in series across the tip and ring trunk conductors leading to the jack when relay 6 is released, are for idle line termination to prevent repeaters, which may be connected to this trunk through a toll cord circuit, from singing.

It should be understood that, while this invention has been described in connection with a particular disclosure, the invention is not limited to such a specific disclosure, but may be equally well applied to other circuit arrangements without departing from the spirit of the invention.

What is claimed is:

1. In a telephone system, a calling line, a central office, a line circuit at said central office permanently connected to said calling line, an automatic coin box substation connected to said calling line, a plurality of automatic progressively movable switches in said central office, means at said substation for operating said switches in tandem, means including said plurality of switches when operated in tandem for extending a connection from said calling line to a called line, a pair of talking conductors included in said connection, a first control conductor included in said connection for controlling the release of said switches, a second control conductor included in said connection, and means controlled over said second control conductor for controlling the automatic operation of said coin box.

2. In a telephone system, a calling line, a central office, a line circuit at said central office permanently connected to said calling line, an automatic coin box substation connected to said calling line, a plurality of automatic progressively movable switches in said central office, means at said substation for operating said switches in tandem, means including said plurality of switches when operated in tandem for extending a connection from said calling line to a called line, a pair of talking conductors included in said connection, a first control conductor included in said connection for controlling the release of said switches, a second control conductor included in said connection, and means controlled over said second control conductor for controlling the automatic collection or refund of a deposited coin at said coin box in accordance with whether or not the called party on said called line answers said connection.

3. In a telephone system, a calling line, a central office, a line circuit at said central office permanently connected to said calling line, an automatic coin box substation connected to said calling line, a plurality of automatic progressively movable switches in said central office, means at said substation for operating said switches in tandem, means including said plurality of switches when operated in tandem for extending a connection from said calling line to a called line, a pair of talking conductors included in said connection, a first control conductor included in said connection for controlling the release of said switches, a second control conductor included in said connection, and means controlled over said second control conductor for controlling the application of one or another D. C. potential to said calling line for collecting or refunding a deposited coin at said coin box in accordance with whether or not the called party on said called line removes the receiver during said connection.

4. In a telephone system, subscriber's lines having paystation equipment, a directively controlled selector switch and a directively controlled connector switch for establishing inter-connections between said lines, a paystation repeater individual to said selector, level marking means in said selector, coin collect and refund means in said repeater for controlling the collection and refund of coins deposited in the paystation equipment of a calling subscriber's line, means including said level marking means for permitting calls to be extended to called lines reached by way of certain levels without the deposit of a coin at a calling substation on one of said lines, and means including said level marking means for permitting calls to be extended to called lines reached by way of other than said certain levels only in response to the deposit of a coin at said calling substation.

5. In a telephone system; a subscriber's line and associated substation; an operator's position; means for extending a talking connection between said line and said position, said connection being in two conductively disconnected and inductively connected sections; paystation mechanism at said substation; means controlled at said operator's position for conductively connecting said sections and for applying ringing current thereto for ringing said substation; and means controlled at said operator's position for conductively connecting said sections and for applying coin control current thereto for collecting or refunding coins deposited in said paystation mechanism.

6. In a telephone system; a subscriber's line and associated substation; an operator's position; means including an automatic switch for extending a talking connection between said line and said position, said connection being in two conductively disconnected and inductively connected sections; paystation mechanism at said substation; means controlled at said operator's position for conductively connecting said sections and for applying ringing current thereto for ringing said substation; means controlled at said operator's position for conductively connecting said sections; and means responsive to said last named means for applying coin control current to said subscriber's line by way of said automatic switch for collecting or refunding coins deposited in said paystation mechanism.

7. In an automatic telephone system, calling lines, paystations for said calling lines, a selector for extending connections from said calling lines to called lines in a plurality of separate groups, a group wiper for said selector contacting only a single bank contact for each selected level, and circuits including said group wiper rendering it necessary to deposit coins at said paystations before connections can be extended to certain of said groups of lines while calls can be extended to certain other of said groups of lines without the deposit of coins.

8. In an automatic telephone system, calling lines, paystations for said calling lines, a selector for extending connections from said calling lines to called lines in a plurality of separate groups, a plurality of group wipers for said selector each contacting only a single bank contact for each selected level, circuits including one of said group wipers rendering it necessary to deposit coins at said paystations before connections can be extended to certain of said groups of lines while calls can be extended to certain other of said groups of lines without the deposit of coins, and circuit means including the other of said group wipers for canceling one numerical digit dialled into said selector whereby a plurality of numerical digits are required to effect the selection of one of said groups.

9. In an automatic telephone system; a line; a paystation on said line; an operator's position; an automatic switch; means including said automatic switch and controlled by the subscriber at said paystation for establishing a connection from said paystation line to said position, said connection comprising two inductively connected talking sections; a holding conductor connected through a wiper of said switch for holding said connection; a control conductor connected through another wiper of said switch; and means including said control conductor controlled from said position for conductively uniting said sections for the purpose of controlling the collection and refund of coins at said paystation.

10. In an automatic telephone system; a line; a paystation on said line; an operator's position; an automatic switch; means including said automatic switch and controlled by the subscriber at said paystation for establishing a connection from said paystation line to said position, said connection comprising two inductively connected talking sections; a holding conductor connected through a wiper of said switch for holding said connection; a control conductor connected through another wiper of said switch; means including said control conductor controlled from said position for conductively uniting said sections for the purpose of controlling the collection and refund of coins at said paystation; and means for transmitting a signal to said position to indicate to the operator that a paystation line is on said connection.

11. In an automatic telephone system; a central office; a calling and a called station; a talking connection extending between said stations comprising one or more automatic switches, said connection also comprising a first section extending to said calling station inductively connected to a second section extending to said called station; a coin control device at said calling station; a source of coin control current at said central office; a first relay for reversing the line conductors in said first section; a second relay for reversing the line conductors in said second section; means controlled by said called station for operating said second relay; means controlled by the operation of said second relay for operating said first relay; means controlled by the operation of said second relay for conductively uniting said stations; and means including said last mentioned means for extending said source of coin control current to said calling station.

12. In an automatic telephone system; a central office; a calling and a called station; a talking connection extending between said stations comprising one or more automatic switches, said connection also comprising a first section extending to said calling station inductively connected to a second section extending to said called station; a coin control device at said calling station; a source of coin control current at said central office; a first relay for reversing the line conductors in said first section; a second relay for reversing the line conductors in said second section; means controlled by said called station for operating said second relay; means including said switches but exclusive of said talking connection controlled by the operation of said second relay for operating said first relay; means controlled by the operation of said second relay for conductively uniting said stations; and means including said last mentioned means for extending said source of coin control current to said calling station.

13. In a telephone system; means including a series of automatic switches and interconnecting trunk lines for extending a talking connection from the line conductors of a calling line to the line conductors of a called line, one of said switches being a final connector switch; means in said final connector switch responsive to the completion of said talking connection for reversing the line conductors of said calling line from normal to reverse condition; and means responsive to said last mentioned means for restoring the line conductors of said calling line to normal condition.

14. In a telephone system, a subscriber's line, a coin collect and refund device connected to said line, a trunk circuit, subscriber controlled means for making a connection from said subscriber's line and device to said trunk circuit, a source of coin collect current and a time delay device at said trunk circuit, a source of coin refund current, operator controlled means including said delay device responsive to said operator answering said connection for applying current from said coin refund source to actuate said collect and refund device to refund a coin deposited therein, and operator controlled means at said trunk circuit for holding said connection and for ringing back over said subscriber's line after the subscriber thereon has retired from said connection.

15. In an automatic telephone system, a first calling line equipped with a paystation, a second calling line not equipped with a paystation, means including automatic selector and connector switches for extending connections from either of said calling lines to called lines in separate groups, indicating means for indicating whether a connection is being extended from said first or from said second calling line, means for extending a conductive connection from the line conductors of said second calling line through one or more of said selector switches to a connector switch in one of said groups, means controlled by impulses transmitted from said second calling line for controlling said connector switch over said conductive connection, means for extending an inductive connection from the line conductors of said first calling line through one or more of said selector switches to a connector switch in said one group, means controlled by impulses transmitted from said first calling line for controlling said connector switch over said inductive connection by receiving said impulses in one portion of said inductive connection and repeating them into another portion of said inductive connection, and means including said indicating means for effecting said conductive or said inductive control of said connector switch.

16. In an automatic telephone system, a first calling line equipped with a paystation, a second calling line not equipped with a paystation, means including automatic selector and connector switches for extending connections from either of said calling lines to called lines in separate groups, indicating means for indicating whether a connection is being extended from said first or from said second calling line, means for extending a conductive connection from the line conductors of said second calling line through one or more of said selector switches to a connector switch in one of said groups, means controlled by impulses transmitted from said second calling line for controlling said connector switch over said conductive connection, means for extending an inductive connection from the line conductors of said first calling line through one or more of said selector switches to a connector switch in said one group, means controlled by impulses transmitted from said first calling line for controlling said connector switch over said inductive connection by receiving said impulses in one portion of said inductive connection and repeating them into another portion of said inductive connection, means including said indicating means for effecting said conductive or said inductive control of said connector switch, level marking wipers in said selector switches, and means including the level marking wiper of a selector used in said connection for permitting or preventing calls from said first calling line being completed to called lines reached through certain levels of the associated selector.

References Cited in the file of this patent

UNITED STATES PATENTS

| | | |
|---|---|---|
| 1,792,452 | Tharp et al. | Feb. 10, 1931 |
| 1,792,651 | Mathias | Feb. 17, 1931 |
| 1,823,679 | Busch | Sept. 15, 1931 |
| 1,904,252 | Robb | Apr. 18, 1933 |
| 2,226,731 | Lomax | Dec. 31, 1940 |
| 2,332,872 | Shann | Oct. 26, 1943 |
| 2,385,720 | Molnar | Sept. 25, 1945 |
| 2,471,087 | Anderson | Aug. 24, 1949 |
| 2,483,206 | Jones | Sept. 27, 1949 |
| 2,558,571 | Lamberty | June 26, 1951 |
| 2,615,092 | Lomax | Oct. 21, 1952 |